W. HARPER, Jr.
INTERNAL COMBUSTION ENGINE.
APPLICATION FILED DEC. 6, 1907. RENEWED OCT. 30, 1912.
1,063,538.  Patented June 3, 1913.
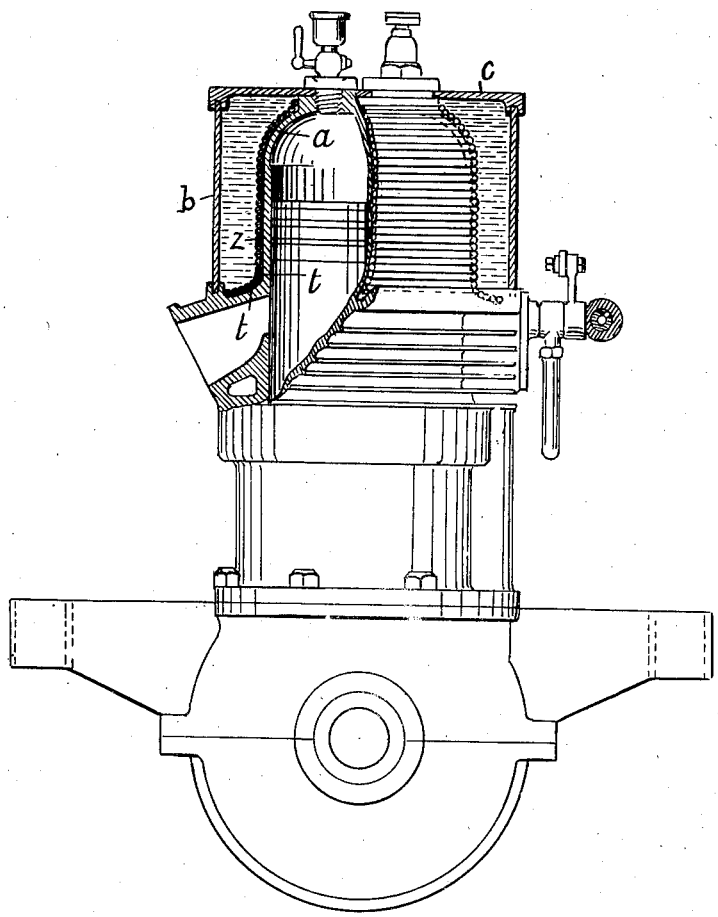
Witnesses:
Samuel W. Balch
Frank C. Cole.
Inventor,
William Harper, Jr.,
by Thomas Ewing, Jr.
Attorney.

UNITED STATES PATENT OFFICE.

WILLIAM HARPER, JR., OF NEW BLOOMFIELD, PENNSYLVANIA, ASSIGNOR, BY MESNE ASSIGNMENTS, OF THREE-TENTHS TO HARPER ENGINEERING COMPANY, A CORPORATION OF NEW YORK, AND SEVEN-TENTHS TO THOMAS A. NEVINS, OF EAST ORANGE, NEW JERSEY.

INTERNAL-COMBUSTION ENGINE.

1,063,538. Specification of Letters Patent. Patented June 3, 1913.

Original application filed June 10, 1907, Serial No. 378,147. Divided and this application filed December 6, 1907, Serial No. 405,301. Renewed October 30, 1912. Serial No. 728,725.

*To all whom it may concern:*

Be it known that I, WILLIAM HARPER, Jr., a citizen of the United States of America, and a resident of New Bloomfield, Perry county, Pennsylvania, have invented new and useful Improvements in Internal-Combustion Engines, of which the following is a specification.

The object of this invention is to provide means in a water-cooled power cylinder for preventing over-cooling of the cylinder and the consequent decrease in efficiency entailed by such over-cooling.

To this end the invention consists in the provision of thermal insulation between the walls of the power cylinder and the water surrounding the cylinder, whereby the heat is transferred from the cylinder walls less rapidly than is the case if the cylinder and water are directly in contact, even if the water circulation is held back to the point of steaming of the water.

In the accompanying sheet of drawings, which forms a part of this application, the figure shows one cylinder, broken away, of an internal combustion engine embodying my invention.

The engine illustrated is of the two-cycle type set forth in my application for Letters Patent of the United States Sr. No. 378,147, filed June 10, 1907, of which application this is a divisional application.

Around the power cylinder *a* are side walls *b* and a top *c* forming with the power-cylinder walls an annular chamber in which water is maintained in circulation to form the usual water-jacket. Round wire *z* is coiled outside the walls of the power cylinder. In this way small triangular spaces *t t* are formed between contiguous coils and the walls of the cylinder. These spaces are more or less cut off from the main body of the water-jacket chamber, but not entirely, by reason of the natural irregularities of the wire. In consequence, water leaking into these spaces is quickly converted into superheated steam which is retained and the chambered structure thus formed constitutes a thermal insulation, leaving opportunity for the heat of the cylinder to reach the water mainly by contact conduction through the points of contact between the wire and cylinder. In this way the cooling effect of the water is restricted and the cylinder is cooled only so far as may be necessary to prevent premature firing while further reduction of temperature and consequent lowering of efficiency of the engine is avoided.

I do not limit my invention in its broader aspect to the specific details as herein set forth, since the requisite thermal insulation may be provided in other ways than those herein set forth, and if provided by trapping steam, the pockets therefor need not be of the shape or be formed in the specific manner indicated.

What I claim as new and desire to secure by Letters Patent of the United States is:

1. In an internal combustion engine, a power-chamber, means coöperating with the walls of which to form steam-retaining pockets, and a water-jacket surrounding the pocket forming means and directly communicating with the pockets, substantially as described.

2. In an internal combustion engine, a power-chamber, the walls of which are surrounded by a coil of wire forming with the walls steam-retaining pockets, and a water-jacket surrounding the coil of wire, substantially as described.

Signed by me at New York city, N. Y., this 27th day of November, 1907.

WILLIAM HARPER, JR.

Witnesses:
SAMUEL W. BALCH,
FRANK C. COLE.